United States Patent
Heinrich

(10) Patent No.: US 9,726,764 B1
(45) Date of Patent: Aug. 8, 2017

(54) SYSTEM AND MEHTOD FOR PROVIDING SPACE-BASED PRECISION POSITION CORRELATIONS FOR PROMOTING IMPROVED AVAILABILITY, ACCURACY AND INTEGRITY

(75) Inventor: Richard E. Heinrich, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 219 days.

(21) Appl. No.: 12/632,448

(22) Filed: Dec. 7, 2009

(51) Int. Cl.
*G01S 19/40* (2010.01)

(52) U.S. Cl.
CPC .................... *G01S 19/40* (2013.01)

(58) Field of Classification Search
CPC ..................................................... G01S 19/40
USPC ............. 342/357.29, 357.31, 357.73, 357.58
See application file for complete search history.

(56) References Cited

U.S. PATENT DOCUMENTS

| | | | | |
|---|---|---|---|---|
| 5,323,163 | A * | 6/1994 | Maki | G01S 19/426 |
| | | | | 342/357.48 |
| 5,359,521 | A * | 10/1994 | Kyrtsos et al. | 701/470 |
| 5,760,737 | A * | 6/1998 | Brenner | 342/357.58 |
| 5,923,287 | A * | 7/1999 | Lennen | 342/357.73 |
| 5,926,132 | A * | 7/1999 | Brenner | 342/357.29 |
| 5,995,042 | A * | 11/1999 | Durboraw, III | G01S 19/215 |
| | | | | 342/357.58 |
| 6,313,786 | B1 * | 11/2001 | Sheynblat | G01C 21/206 |
| | | | | 342/357.23 |
| 6,408,246 | B1 * | 6/2002 | Fox | 701/300 |
| 6,493,650 | B1 * | 12/2002 | Rodgers et al. | 702/150 |
| 6,639,549 | B2 * | 10/2003 | Vanderwerf et al. | 342/357.58 |
| 7,990,315 | B2 * | 8/2011 | Chen et al. | 342/357.73 |
| 8,063,820 | B2 * | 11/2011 | Alizadeh-Shabdiz | 342/357.73 |
| 8,334,807 | B2 | 12/2012 | Gaal et al. | |
| 8,521,179 | B2 * | 8/2013 | Hasegawa | 455/456.1 |
| 2004/0189515 | A1 * | 9/2004 | Vannucci | 342/357.01 |
| 2006/0140254 | A1 * | 6/2006 | Pietila | G01S 19/22 |
| | | | | 375/147 |

(Continued)

OTHER PUBLICATIONS

B.W. Parkinson et al., Global Positioning System: Theory and Applications, vol. 1; Progress in Astronautics and Aeronatics, vol. 163, American Institute of Aeronautics and Astronautics, Inc., p. 32, 1996.*

(Continued)

*Primary Examiner* — Bernarr Gregory
*Assistant Examiner* — Fred H Mull
(74) *Attorney, Agent, or Firm* — Angel N. Gerdzhikov; Donna P. Suchy; Daniel M. Barbieri

(57) ABSTRACT

The present invention is directed to system for providing precision location determination. The system includes a receiver configured for receiving both a first set of signals from a first constellation of satellites and a second set of signals from a second constellation of satellites. The system further includes a processor, which is connected to the receiver and is configured for processing the received satellite signals. The system further includes control programming for executing on the processor. The control programming is configured for determining a first location of the receiver based upon the first set of received signals and for determining a second location of the receiver based upon the second set of received signals. The control programming is further configured for correlating the first location and the second location to provide an enhanced location for the receiver.

16 Claims, 7 Drawing Sheets

(56) References Cited

U.S. PATENT DOCUMENTS

| | | | |
|---|---|---|---|
| 2007/0225912 A1* | 9/2007 | Grush | G01C 21/20 |
| | | | 701/469 |
| 2007/0275658 A1* | 11/2007 | Gaal et al. | 455/12.1 |
| 2008/0062041 A1* | 3/2008 | Lee | G01S 19/46 |
| | | | 342/357.29 |
| 2008/0068263 A1* | 3/2008 | Tekawy et al. | 342/357.11 |
| 2008/0074317 A1* | 3/2008 | Harper et al. | 342/357.02 |
| 2009/0040104 A1* | 2/2009 | Mitsunaga et al. | 342/357.15 |
| 2009/0150074 A1* | 6/2009 | Vanderwerf | 701/213 |
| 2010/0291947 A1* | 11/2010 | Annamalai | 455/456.1 |
| 2011/0012786 A1* | 1/2011 | Chang | G01S 19/21 |
| | | | 342/357.77 |
| 2011/0025558 A1 | 2/2011 | Levy | |
| 2011/0025559 A1* | 2/2011 | Chansarkar et al. | 342/357.73 |
| 2011/0057833 A1 | 3/2011 | France et al. | |
| 2011/0068973 A1* | 3/2011 | Humphreys | G01S 19/215 |
| | | | 342/357.3 |
| 2013/0342396 A1 | 12/2013 | O'Connor et al. | |

OTHER PUBLICATIONS

Correlate. (2011). In The American Heritage Dictionary of the English Language. Retrieved from http://search.credoreference.com/content/entry/hmdictenglang/correlate/0.*

Dilution of precision (DOP). (2001). In Hargrave's Communications Dictionary, Wiley. Hoboken, NJ: Wiley. Retrieved from http://search.credoreference.com/content/entry/hargravecomms/dilution_of_precision_dop/0.*

Position dilution of precision (PDOP). (2001). In Hargrave's Communications Dictionary, Wiley. Hoboken, NJ: Wiley. Retrieved from http://search.credoreference.com/content/entry/hargravecomms/position_dilution_of_precision_pdop/0.*

B. Hofmann-Wellenhof et al., Global Positioning System: Theory and Practice, third edition, Springer-Verlag, p. 84-85, 1994.*

B.W. Parkinson et al., Global Positioning System: Theory and Applications, vol. 1; Progress in Astronautics and Aeronautics, vol. 163, American Institute of Aeronautics and Astronautics, Inc., p. 473-475, 1996.*

* cited by examiner

SYSTEM AND MEHTOD FOR PROVIDING SPACE-BASED PRECISION POSITION CORRELATIONS FOR PROMOTING IMPROVED AVAILABILITY, ACCURACY AND INTEGRITY

FIELD OF THE INVENTION

The present invention relates to the field of navigation systems and particularly to a system and method for providing space-based precision position correlations for promoting improved availability, accuracy and integrity.

BACKGROUND OF THE INVENTION

A number of currently available systems and methods for position/location determination may not provide desired accuracy.

Thus, it would be desirable to provide systems and methods for position/location determination which obviate the above-referenced problem associated with currently available solutions.

SUMMARY OF THE INVENTION

Accordingly, an embodiment of the present invention is directed to a system for providing precision location determination, said system including: a receiver module, the receiver module being configured for receiving a first set of satellite signals from a first constellation of satellite navigation system satellites and a second set of satellite signals from a second constellation of satellite navigation system satellites; a processor, the processor being connected to the receiver module, the processor being configured for processing the first set of signals received from the first constellation of satellites, the processor being further configured for processing the second set of signals received from the second constellation of satellites; and control programming for executing on the processor, wherein the control programming is configured for determining a first location of the receiver module based upon the first set of signals received from the first constellation of satellites, the control programming being further configured for determining a second location of the receiver module based upon the second set of signals received from the second constellation of satellites, the control programming being further configured for correlating the first location and the second location to provide an enhanced location for the receiver module.

A further embodiment of the present invention is directed to a method for providing precision location determination via a receiver module, said method including: receiving a plurality of satellite signals from a plurality of constellations of satellite navigation system satellites; processing the plurality of signals received from the plurality of constellations of satellite navigation system satellites; determining a plurality of locations of the receiver module based upon the plurality of signals received from the plurality of constellations of satellites; evaluating the plurality of determined locations; and determining an enhanced location for the receiver module based upon said evaluation of the plurality of determined locations.

An additional embodiment of the present invention is directed to a computer program product including: a signal-bearing medium bearing: computer-usable code configured for receiving a plurality of satellite signals from a plurality of constellations of satellite navigation system satellites; computer-usable code configured for processing the plurality of signals received from the plurality of constellations of satellite navigation system satellites; computer-usable code configured for determining a plurality of locations of the receiver module based upon the plurality of signals received from the plurality of constellations of satellites; computer-usable code configured for evaluating the plurality of determined locations; and computer-usable code configured for determining an enhanced location for the receiver module based upon said evaluation of the plurality of determined locations.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

The United States Global Positioning System (GPS) constellation may be at risk in that satellites of the constellation may likely fail before replacement satellites can be positioned. This constellation-based (ex.—satellite-based) positioning system is a key component of the critical aviation infrastructure. Thus, if this satellite-based positioning system (ex.—satellite system) were to fall below certain critical performance thresholds, the system may degrade in terms of throughput, efficiency, safety and overall performance.

A number of different satellite-based positioning systems (ex.—space-based positioning systems) may exist in the future. These future systems may be placed by different sovereign nations and may provide slightly different levels of performance. Each system may be expected to provide a level of safety-of-life services for use by the aeronautical community. Candidate systems may include, but are not limited to, Galileo, Compass, Global Navigation Satellite System (GLONASS) and Multifunctional Transport Satellites (MTSAT).

Current location determination systems involve utilization of a single satellite-based positioning system/constellation. For instance, a position/location (ex.—of a receiver/receiver module) may be determined by the receiver by using signals received from the satellites of a single satellite-based positioning system/a single satellite constellation (ex.—a GPS satellite constellation). However, in order to determine the position/location with a reasonable degree of accuracy and/or precision, signals may need to be received by the receiver from a threshold number of satellites included in that positioning system/constellation. For example, signals from three satellites of the constellation may need to be received by the receiver module in order to determine the position/location of the receiver. This may sometimes be a challenge since, in some instances, one or more of the satellites of the constellation may not be in view (ex.—the signals of one or more satellites of the constellation may not be available/accessible to the receiver module for use in location determination) at a given time. In further instances, one or more of the satellites of the constellation may be low to the horizon, may have very low look angles, may have poor geometries and thus, may present noisy signal(s) to the receiver. These noisy signals may have a large multipath component which may skew the location which is determined by the receiver. Such skewing may make it difficult to obtain a high precision location determination. The present invention provides a system(s)/method(s) for position determination which obviate(s) the above-referenced problems associated with currently available solutions.

Reference will now be made in detail to the presently preferred embodiments of the invention, examples of which are illustrated in the accompanying drawings.

Figure 1:
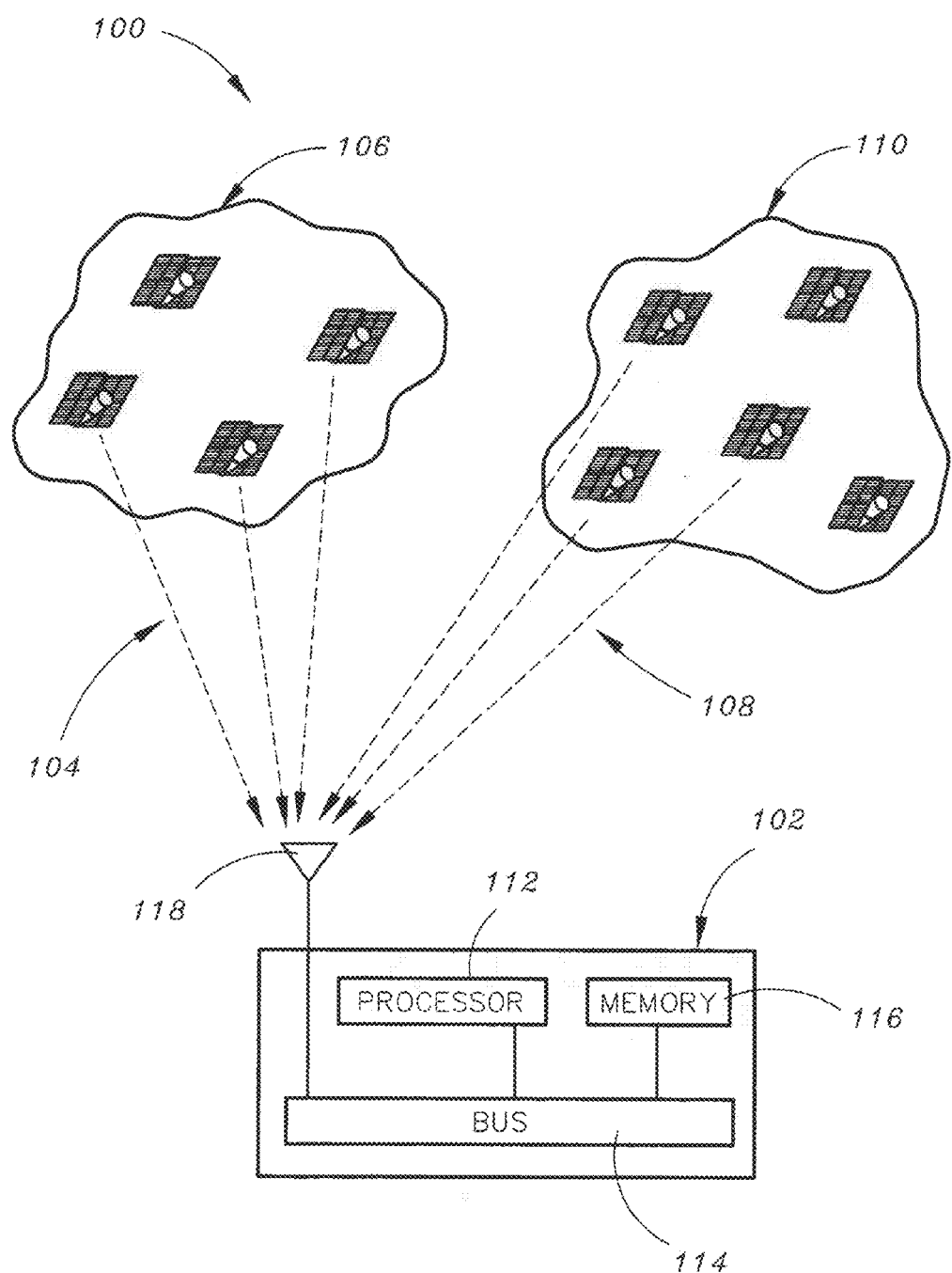
FIG. 1 is a block diagram illustrating a system for providing precision location determination in accordance with an exemplary embodiment of the present invention.

Referring to FIG. 1, a block diagram illustrating a system for providing precision location determination in accordance with an exemplary embodiment of the present invention is shown. The system 100 may include a receiver module 102 (ex.—receiver 102). For example, the receiver 102 may be a GPS receiver, a Multi-mode receiver (MMR), or the like. The receiver 102 may be configured for receiving satellite signals from a plurality of (ex.—two or more) satellite constellations. For instance, the receiver 102 may include an antenna 118 (ex.—a steerable antenna) configured for receiving the satellite signals. In exemplary embodiments, the receiver 102 may be configured for receiving a first set of satellite signals 104 from a first constellation of satellites 106. For example, the first constellation of satellites 106 may be a group of electronic satellites (ex.—satellite navigation system satellites) working in concert. Further, the first constellation of satellites 106 may have coordinated ground coverage, may operate together under shared control, and may be synchronized so that the each satellite of the first constellation overlaps well in coverage and complements rather than interferes with coverage of the other satellites of the first constellation. In a current embodiment of the present invention, the first constellation of satellites 106 may be a Global Positioning System (GPS) satellite constellation (ex.—of GPS satellites). In alternative embodiments of the present invention, the first constellation of satellites 106 may be any one of a number of satellite constellation types including but not limited to: a Galileo satellite constellation, a Compass satellite constellation, a Global Navigation Satellite System (GLONASS) satellite constellation, and/or a Multifunctional Transport Satellites (MTSAT) satellite constellation.

In the embodiment illustrated in FIG. 1, the receiver 102 may be further configured for also receiving a second set of satellite signals 108 from a second constellation of satellites 110. For instance, the second constellation of satellites 110 may be a group of electronic satellites (ex.—satellite navigation system satellites) working in concert. Further, the second constellation of satellites 110 may have coordinated ground coverage, may operate together under shared control, and may be synchronized so that the each satellite of the second constellation overlaps well in coverage and complements rather than interferes with coverage of the other satellites of the second constellation. In a current embodiment of the present invention, the second constellation of satellites 110 may be any one of a number of satellite constellation types, including but not limited to: a GPS satellite constellation, a Galileo satellite constellation, a Compass satellite constellation, a GLONASS satellite constellation, and/or a MTSAT satellite constellation.

In exemplary embodiments of the present invention, the receiver 102 may be connected to (ex.—may include) a processor 112. For example, the processor 112 may be connected to the antenna 118 via a bus 114. The processor 112 may be configured for processing the signals (104, 108) received via the receiver 102 (ex.—via the antenna 118) from the first and second satellite constellations (106, 110). For instance, in current embodiments of the present invention, the receiver 102 (ex.—via the processor 112) may be configured for extracting timing pulses from the received signals (104, 108). In further embodiments, the receiver 102 may be connected to (ex.—may include) memory 116, said memory being connected to the processor 112 via the bus.

In current embodiments of the present invention, the system 100 is configured (ex.—via control programming executing on the processor 112) for determining a first location (ex.—of the receiver 102) based upon the set of signals 104 received from the first constellation of satellites 106. Further, the system 100 is configured (ex.—via control programming executing on the processor 112) for determining a second location (ex.—of the receiver 102) based upon the set of signals 108 received from the second constellation of satellites 110. As mentioned above, the receiver 102 (ex.—via the processor 112) may extract timing pulses from the received signals (104, 108) and may utilize said extracted timing pulses for determining the first location and the second location. In exemplary embodiments, the first location (ex.—the first location determination) and/or the second location (ex.—second location determination) may each be a three-dimensional location (ex.—latitude, longitude and altitude) of the receiver 102.

In further embodiments of the present invention, the system 100 may be configured (ex.—via control programming executing on the processor 112) for generating and providing an enhanced location (ex.—a precision location) for the receiver 102 based upon the first determined location (ex.—the first location determination) and the second determined location (ex.—the second location determination). For example, the system 100 may be configured for evaluating and/or correlating the first determined location and the second determined location for determining and providing the enhanced (ex.—optimized) location of the receiver 102. In a number of embodiments of the present invention, the receiver module 102 (ex.—MMR) may utilize multiple correlators to determine precision position (ex.—precision location) by scoring the multiple (ex.—the first and second) location determinations (ex.—position solutions) and then correlating the multiple location determinations to determine and provide a final (ex.—an enhanced) location determination. In exemplary embodiments, the enhanced location determination may be a three-dimensional location (ex.—latitude, longitude and altitude) of the receiver 102.

Figure 2:
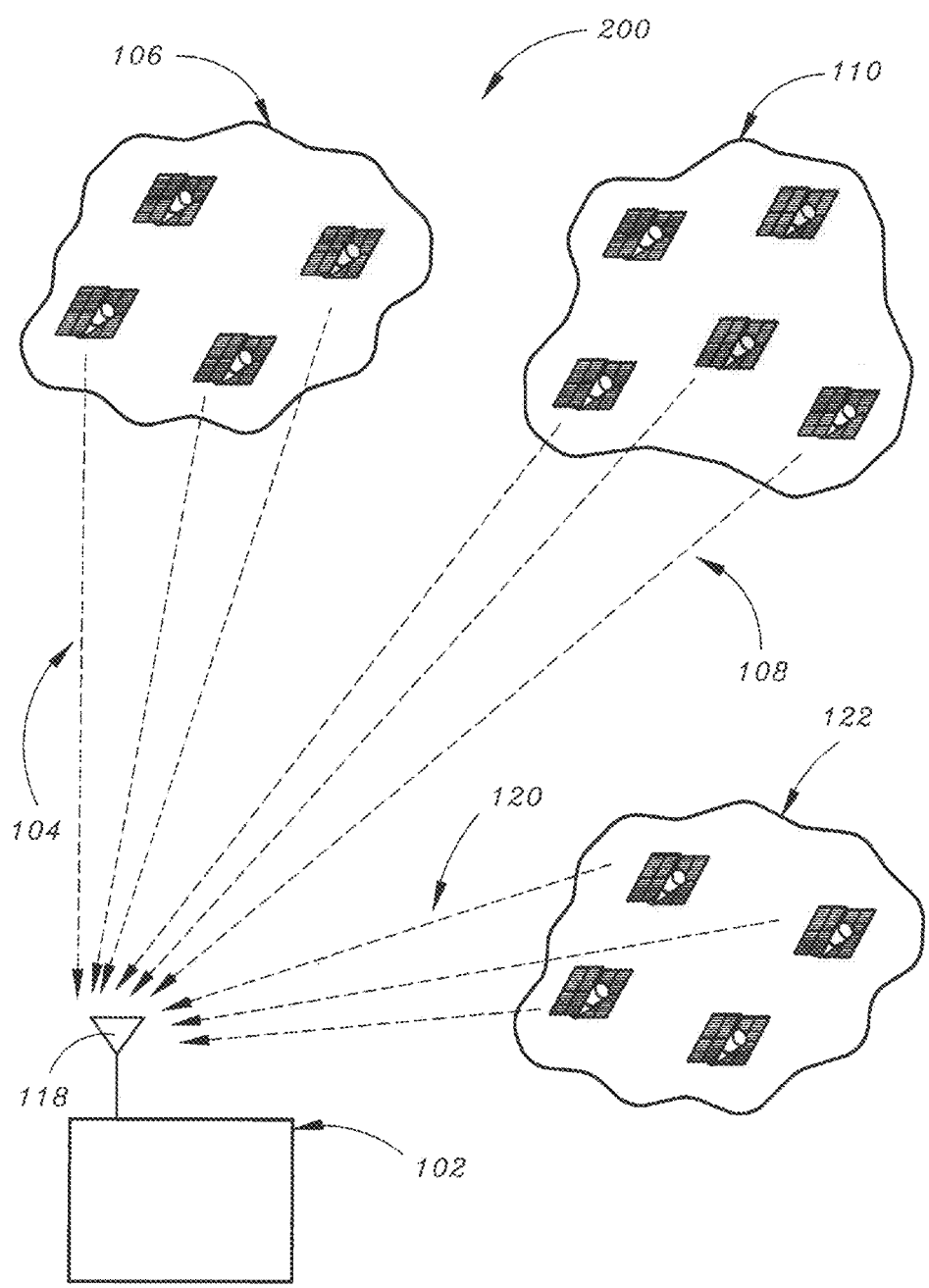
FIG. 2 is a block diagram illustrating a system for providing precision location determination in accordance with an alternative exemplary embodiment of the present invention.

In alternative embodiments, the receiver 102 may be configured for receiving sets of satellite signals from more than two constellations of satellites. In the system 200 shown in FIG. 2, the receiver 102 (along with being configured to receive sets of satellite signals (104, 108) from the first and second satellite constellations (106, 110) as described above) may be further configured for receiving a third set of satellite signals 120 from a third constellation of satellites 122. The third constellation of satellites 122 may be any one of a number of satellite constellation types including but not limited to: a GPS satellite constellation, a Galileo satellite constellation, a Compass satellite constellation, a Global GLONASS satellite constellation, and/or a MTSAT satellite constellation. Further, the system 200 may be configured (ex.—via control programming executing on the processor 112) for determining a first, second and third locations (ex.—of the receiver 102) based upon the sets of signals (104, 108, 120) received from the constellations of satellites (106, 110, 122). As mentioned above, the receiver 102 (ex.—via the processor 112) may extract timing pulses from the received signals (104, 108, 120) and may utilize said extracted timing pulses for determining and providing the first location, the second location and the third location. In exemplary embodiments, the first location, the second location and/or the third location may each may be a three-dimensional location (ex.—latitude, longitude and altitude) of the receiver 102.

In further embodiments of the present invention, the system 200 may be configured (ex.—via control programming executing on the processor 112) for generating and providing an enhanced (ex.—optimized) location for the receiver 102 based upon the first determined location, the second determined location, and the third determined location. For example, the system 200 may be configured for evaluating and/or correlating the first location, the second location, and the third location for determining and providing the enhanced location of the receiver 102. In one or more embodiments of the present invention, the receiver 102 (ex.—MMR) may utilize multiple correlators to determine precision position (ex.—precision location) by scoring the multiple (ex.—the first, second and third) location determinations and then correlating the multiple location determinations to determine and provide a final (ex.—an enhanced) location determination.

In alternative embodiments, based upon said correlation and/or evaluation, the receiver module 102 (ex.—via the processor 112) of the system 200 may be configured for excluding one or more of the first, second, or third location determinations from a potential solution set of location determinations which may be used to generate and provide the enhanced location. For instance, if satellites of the third constellation 122 have very low look angles (ex.—poor geometries), the third location determination, (which is derived from signals 120 provided by third constellation 122) may be excluded from the solution set. Further, the enhanced location determination may then be generated based upon a solution set which includes only the first location determination (derived from signals from the first constellation 106) and the second location determination (derived from signals from the second constellation, and does not include the third location determination. Using this approach, anomalies such as location determinations derived from signals provided by satellites having very low look angles (ex.—poor geometries) may be eliminated from being considered (ex.—may not be used or included) in a potential set of location determinations from which the enhanced location determination may be derived. Thus, noisy, low elevation angle candidate satellites may not be required to be used (ex.—may be selectively eliminated from being used) in location determination. Instead, signals from satellites providing stronger signals (ex.—signals from satellites which are overhead relative to the receiver module, such as signals from the first and second constellations 106, 110) may be used for promoting generation and provision of enhanced (ex.—higher accuracy, higher precision, improved integrity) location determinations. In further embodiments, when implementing satellite constellations as in the present invention, a ground-based application (ex.—implementing a ground-based receiver module) located in areas with tall buildings and/or located in high multipath environments may utilize overhead satellites (rather than low elevation angle satellites) of the multiple positioning systems for mitigating such obstacles and challenges.

In further alternative embodiments, the systems (100, 200) may be configured for giving a greater or lesser weight to one or more of the location determinations when determining the enhanced location determination. For example, rather than eliminating a location determination from a solution set, the systems 100, 200 of the present invention may be configured for giving a greater weight or bias to location determination(s) derived from signals provided by satellite constellations having high look angles and a lesser weight or bias to location determination(s) derived from signals provided by satellite constellations having low look angles. The systems 100, 200 may then be configured for determining the enhanced location determination based upon said relative weighting and/or prioritization of the location determinations (ex.—first, second, and/or third location determinations).

In exemplary embodiments of the present invention, each system (100 or 200) may be configured for determining multiple location determinations (ex.—position solutions) based upon signals received from as many as all of the satellites of the system (100 or 200) which are in view. Further, as mentioned above, each of these multiple position solutions may be correlated with each other for seeking an enhanced (ex.—a best or optimized) location determination.

By implementing multiple satellite-based positioning systems (ex.—constellations) (106, 110, 122) together/in combination, as described above, the systems (100, 200) of the present invention allow for the number of satellites in view to be increased compared to when only a single constellation of satellites is implemented, thereby promoting increased likelihood that location determination will not be interfered with (ex.—will not be prevented) due to temporary inaccessibility of one or more satellites by the receiver 102. Further, by having a larger number of satellites potentially being in view at a given time, the systems (100, 200) of the present invention may decrease the likelihood that satellites providing noisy signals will have to be relied upon for location determination. Thus, the systems (100, 200) of the present invention may promote improved precision in position determination.

In further embodiments, the multiple satellite constellations which may be implemented in the systems 100, 200 may be the same or different types of satellite constellations. For example, possible combinations for multiple satellite constellations which may be implemented in the system 100, 200 may include but is not limited to the following: two or more GPS satellite constellations implemented together; two or more Galileo satellite constellations implemented together; one or more GPS satellite constellations implemented in combination with one or more Galileo satellite constellations; a GPS satellite constellation implemented with a Galileo satellite constellation and a Compass satellite constellation; etc. Satellite constellations which may be implemented may include but are not limited to: GPS, Galileo, Compass, GLONASS, MTSAT. Thus, the systems 100, 200 of the present invention may allow for concurrent implementation (ex.—blending) of two or more different types of satellite constellations for providing precision location determination.

Concurrently implementing multiple satellite constellations for location determination may allow the systems (100, 200) to each act as an airborne flying integrity monitoring function which provides multiple independent location determinations and correlates the multiple location determinations against each other to remove those positions that are most erroneous. For example, when multiple position solutions are calculated and provided, the solutions may be correlated with each other, error may be computed, and the error may be used to develop a differential correction for removing the error.

As referenced above, a threshold number of satellites may be required to be in view in order for the system (100 or 200) to provide precision position determination. In at least one embodiment, in order to obtain two location determinations, the threshold number of satellites required to be in view may be six satellites. In exemplary embodiments, the receiver 102 may be configured for receiving different satellite signals, which may have different signal-in-space protocols. By providing more available (ex.—in-view) satellites, a larger number of location determinations (exs.—correlators, position variants, position solutions) may be generated, correlated, and scored against each other. Further, because the systems (100, 200) of the present invention may implement multiple satellite constellations (106, 110, 122), said systems (100, 200) may avoid reliance upon a single location determination generated from signals received from a single satellite constellation. For instance, rather than having to rely upon a single position solution generated from signals provided by only a GPS constellation or only a Galileo constellation, the systems (100, 200) of the present invention may allow for location determination based upon correlation of multiple location determinations, said multiple location determinations being generated from signals provided from multiple satellite constellations and perhaps combinations of different types (ex.—GPS, Galileo, etc.) of satellite constellations.

Figure 3:
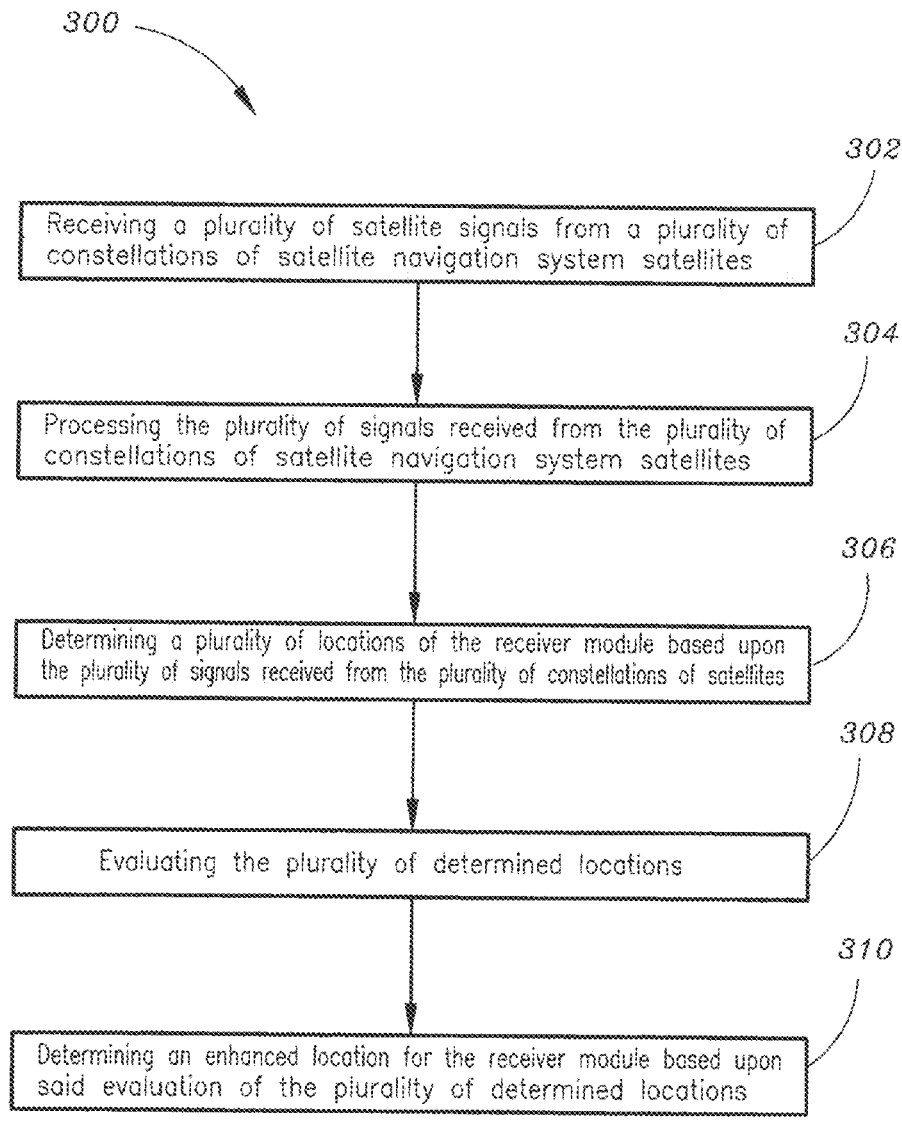
FIG. 3 depicts a flowchart illustrating a method for providing precision location determination in accordance with an exemplary embodiment of the present invention
Figure 4:
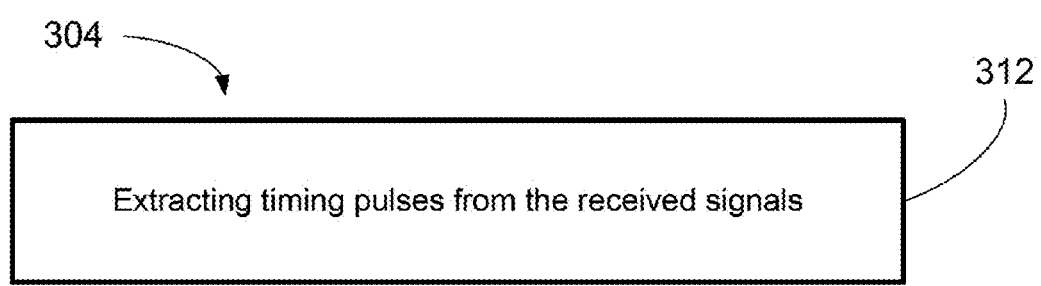
FIG. 4 depicts a sub-step of a step of the method in FIG. 3.

Referring to FIG. 3, a flowchart illustrating a method for providing precision location determination via a receiver module is shown. The method 300 may include the step of receiving a plurality of satellite signals from a plurality of constellations of satellite navigation system satellites 302. The method 300 may further include the step of processing the plurality of signals received from the plurality of constellations of satellite navigation system satellites 304. The method 300 may further include determining a plurality of locations of the receiver module based upon the plurality of signals received from the plurality of constellations of satellites 306. The method 300 may further include evaluating the plurality of determined locations 308. The method 300 may further include determining an enhanced location for the receiver module based upon said evaluation of the plurality of determined locations 310.

Figure 5A:
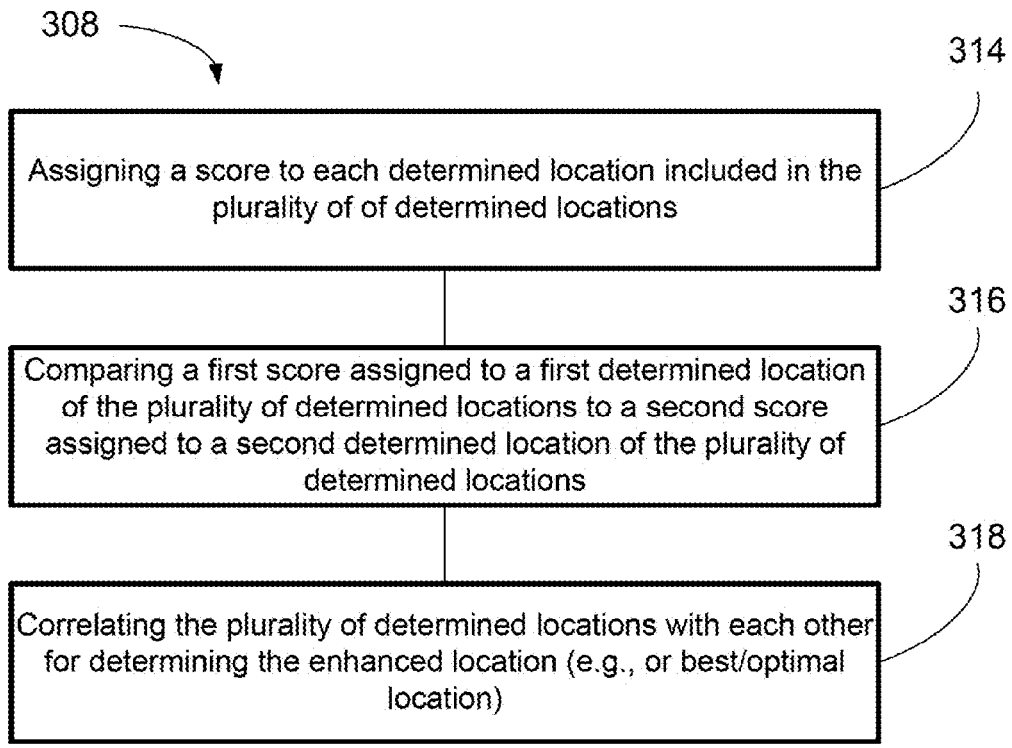
FIGS. 5A-5B depict sub-steps of a step of the method in FIG. 3.

In further embodiments of the present invention, the step of processing the plurality of signals 304 may include extracting timing pulses from the received signals 312. Further, the step of evaluating the plurality of determined locations 308 may include assigning a score to each determined location included in the plurality of determined locations 314 and comparing a first score assigned to a first determined location included in the plurality of determined locations to a second score assigned to a second determined location included in the plurality of determined locations 316 (see, for example, FIG. 5A).

In exemplary embodiments of the present invention, the step of evaluating the plurality of determined locations 308 may include correlating the plurality of determined locations with each other for determining the enhanced location (ex.—the best or optimal location) 318.

Figure 5B:
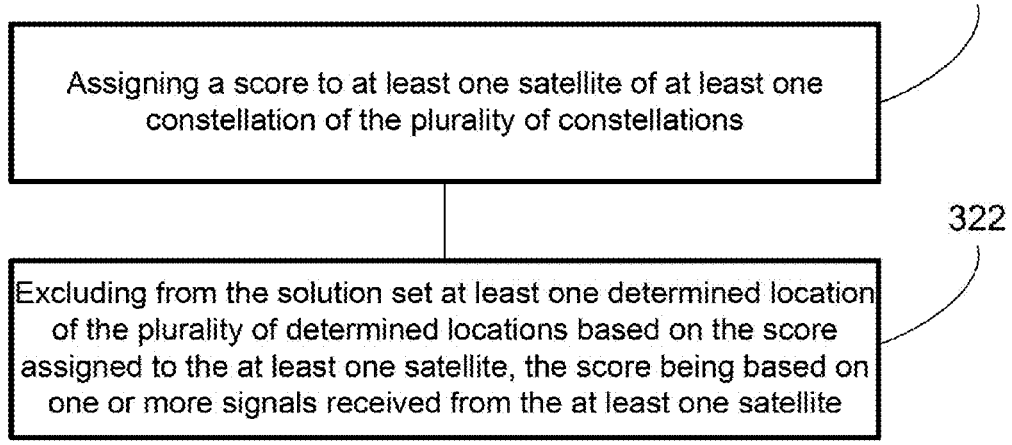
Figure 5C:
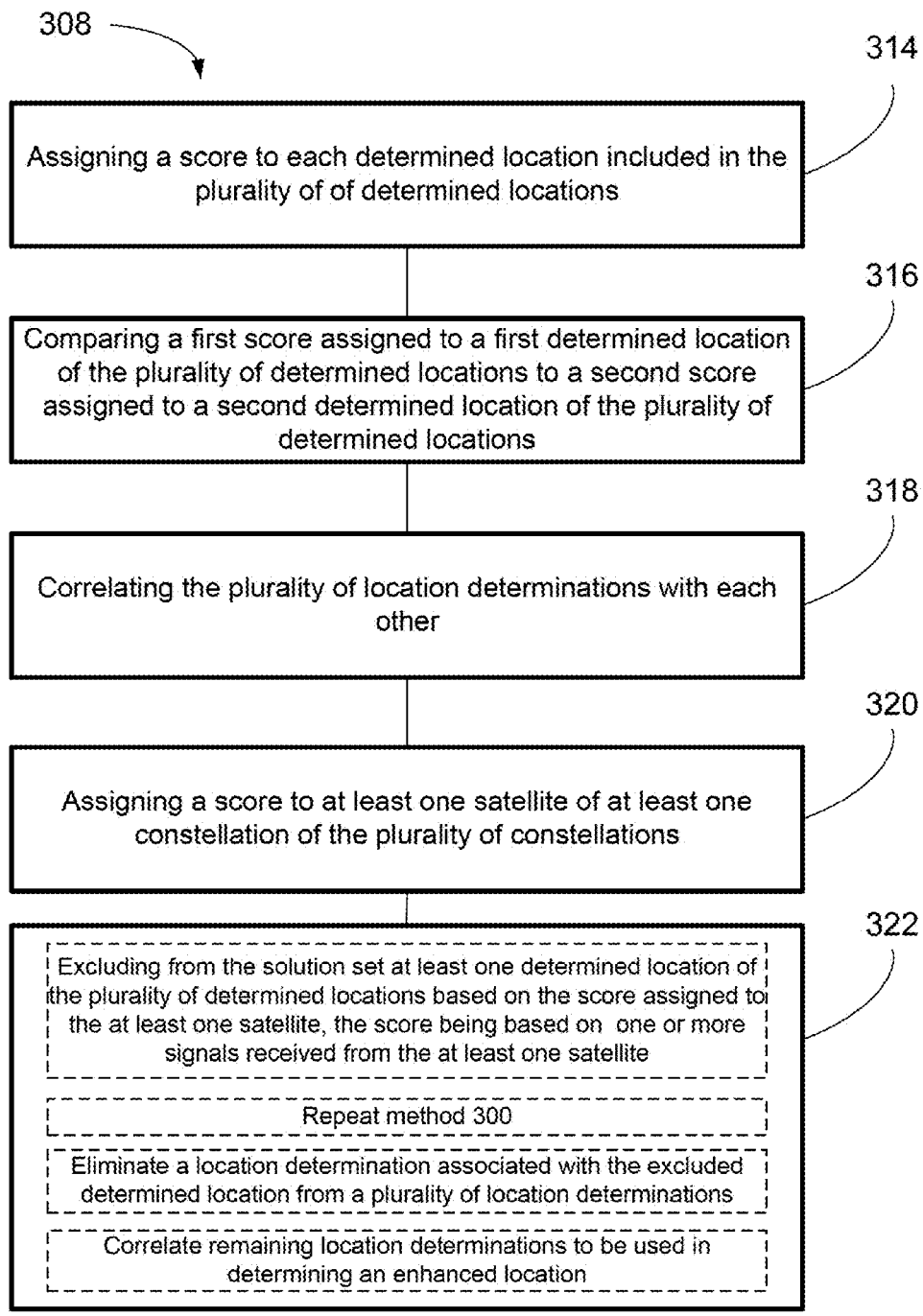
Figure 6:
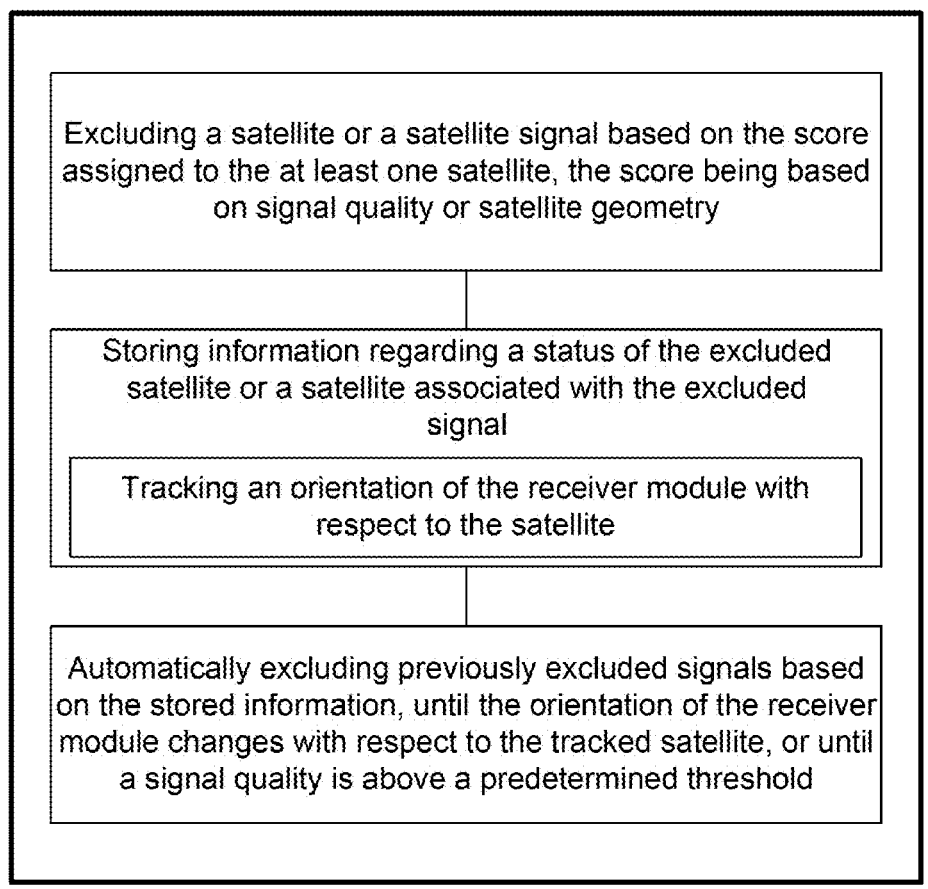
FIG. 6 depicts sub-steps of a step of the method in FIG. 3.

In further embodiments of the present invention, the step of evaluating the plurality of determined locations 308 may include assigning a score to at least one satellite of at least one constellation included in the plurality of constellations 320. In additional embodiments, the step of evaluating the plurality of determined locations 308 may further include, based on said score assigned to the at least one satellite, excluding from the solution set at least one determined location included in the plurality of determined locations which is based upon signals received from the at least one satellite 322 (see FIG. 5B and/or FIG. 5C). For example, the receiver module 102 may determine that signals received from the one or more satellite(s) of the plurality of constellations (and/or determined locations derived from those signals) may be poor quality (ex.—due to signal noise, poor satellite geometry, low look angles) and thus, undesirable for use in determining the enhanced location. Further, the receiver 102 may be configured for excluding from the solution set at least one determined location included in the plurality of determined locations which is based upon such signals (ex.—the poor quality, less desirable signals). Further, the receiver 102 may maintain and/or store information (ex.—such as in a memory) regarding a status of a certain satellite(s). For example, the receiver 102 may be configured for dynamically tracking its orientation relative to the previously excluded satellite(s), and as long as the previously excluded satellites are located at a location relative to the receiver 102 such that the signals provided to the receiver 102 by the excluded satellites are inaccurate (ex.—insufficiently accurate and/or poor quality) at the time the method step(s) are occurring, the receiver 102 may be configured for automatically excluding such previously excluded signals, thereby eliminating the need to re-determine, re-evaluate, and re-score locations based upon said previously excluded signals during subsequent cycles of the method 300 (see FIG. 6). Once the receiver 102 determines that its orientation relative to said previously excluded satellite(s) has changed such that signal(s) provided by said previously excluded satellite(s) to the receiver 102 are of sufficient quality (ex.—are at a quality above a pre-determined threshold; are non-noisy signals, etc.), then said receiver 102 may once again begin re-determining and re-evaluating locations based upon signals from said previously excluded satellites.

The system(s)/method(s) of the present invention may provide a number of advantages. For example, by implementing multiple satellite constellations (and thus providing a larger number of available satellites), problems such as Receiver Autonomous Integrity Monitoring (RAIM) Outage and Predictive RAIM may be mitigated, thereby promoting improved dispatching of aircraft. Further, by implementing multiple satellite constellations, if one of said constellations had to be shut down, a major loss of capability would not ensue. Still further, the multiple, variable geometries presented by the implementation of the multiple satellite constellations may allow for steerable antennas of receiver modules to work around and avoid directional jamming threats, including self-jamming from systems suffering for a soft failure, by selecting multiple satellites which are not in the jamming coverage volume. For example, when the receiver 102 determines that signals from one or more of the satellite(s) are low quality and/or noisy (ex.—due to relative orientation between the satellite(s) and the receiver 102, poor geometry, etc.), the receiver 102 may be configured for steering the steerable antenna 118 so that said antenna 118 is directed away from constellation(s) and/or satellite(s) which provide noisy signals and/or are located in the jamming coverage volume, thereby preventing the receiver 102 from having to receive and process signals from said one or more satellites, determine locations based upon said signals from said one or more satellites, and/or evaluate said locations based upon signals from said one or more satellites. Additionally, by having an increased number of satellites in view at appropriate look angles, the system(s)/method(s) of the present invention may allow for obviation of variable outages, such as floating outage areas and areas of high propagation attenuation which induce outages in the system at the local equator (ex.—equatorial scintillation outages).

The above-referenced characteristics may be enabled by state-of-the-art software-defined radio implementations of signal receivers which may rely upon software detection and protocol insertion to resolve the different origins. Processing may be carried out implementing the above-mentioned correlation/high count correlator structure.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form hereinbefore described being merely an explanatory embodiment thereof, it is the intention of the following claims to encompass and include such changes.

What is claimed is:

1. A system for providing a receiver module position, comprising:

a receiver module and antenna configured to receive one or more satellite signals from each of two or more satellite constellations; and a processor connected to the receiver module and a non-transitory computer-readable storage medium, the processor being configured to access the non-transitory computer-readable storage medium to perform the following steps:

determine a solution set comprising at least a first location and a second location based on the one or more satellite signals received from each of the two or more satellite constellations;

evaluate the locations of the solution set and assign a score to each location of the solution set;

correlate the locations of the solution set including the first location and the second location with each other to remove a location from the solution set based on the assigned scores;

track an orientation of the receiver module with respect to a satellite associated with the location removed from the solution set; and determine a receiver module position based on one or more locations remaining in the solution set.

2. The system of claim 1, wherein the processor is further configured to compute an error associated with a location of the solution set.

3. The system of claim 2, wherein the error is removed from the receiver module via differential correction.

4. The system of claim 1, wherein the two or more satellite constellations include at least two of: Global Positioning System satellites, Galileo satellites, Compass satellites, Global Navigation Satellite System satellites and Multifunctional Transport satellites.

5. The system of claim 1, wherein the one or more satellite signals received from each of two or more satellite constellations comprises at least six satellite signals, and wherein a first signal received from a first satellite has a first signal-in-space protocol and a second signal received from a second satellite has a second signal-in-space protocol, said second signal-in-space protocol being a different signal-in-space protocol than the first signal-in-space protocol.

6. The system of claim 1, wherein a first constellation type of the two or more satellite constellations includes Global Positioning System satellites and a second constellation type includes Galileo satellites.

7. The system of claim 1, wherein the score of each location of the solution set is weighted based on satellite geometry.

8. The system of claim 7, wherein the satellite geometry comprises a low look angle or a high look angle, and wherein the processor is further configured to correlate the plurality of locations of the solution set and determine the receiver module position based on relative weighting or prioritization of the scoring of the locations of the solution set.

9. The system of claim 1, wherein the scoring of each location of the solution set is based on satellite geometry, and wherein the position of the receiver module is a three-dimensional position comprising latitude, longitude, and altitude.

10. A method for providing a position of a receiver module, the method comprising:

receiving, by a receiver module and antenna, one or more satellite signals from each of two or more satellite constellations;

determining, by a processor, a solution set comprising at least a first location and a second location based on the one or more satellite signals received from each of the two or more satellite constellations;

evaluating, by the processor, locations of the solution set including assigning a score to the first location and the second location;

correlating, by the processor, the first location and the second location with each other to remove a location from the solution set based on the assigned score;

tracking an orientation of the receiver module with respect to a satellite associated with the location removed from the solution set; and determining a receiver module position based on one or more locations remaining in the solution set.

11. The method of claim 10, wherein evaluating the locations of the solution set further comprises assigning a score to a satellite associated with one of the first location and the second location, wherein the location is removed based on the score assigned to the first location or the score assigned to the second location and the score assigned to the satellite, and wherein the score assigned to the satellite is assigned based on a signal quality associated with the satellite.

12. The method of claim 10, further comprising:
assigning a score to a satellite based on a signal quality of the satellite, wherein the satellite is a first satellite and the score assigned to the first satellite indicates that the signal quality of the first satellite is poorer than a signal quality of a second satellite.

13. The method of claim 10, wherein the solution set comprises a first solution set, the method further comprising:
automatically excluding a satellite signal of the satellite associated with the location removed from determining a second solution set of at least a third location and a fourth location until the orientation of the receiver module changes with respect to the satellite or a quality of the satellite signal is above a predetermine threshold.

14. The method of claim 13, wherein the satellite signal is automatically excluded until the orientation of the receiver module changes and the quality of the satellite signal is above the predetermined threshold.

15. A computer program product comprising:
a non-transitory memory with electronic instructions configured to be accessed by a processor to cause the processor to perform the following steps:
receive one or more satellite signals from each of two or more satellite constellations;
determine a solution set comprising a plurality of locations of a receiver module based on the one or more satellite signals from each of the two or more satellite constellations;
evaluate the plurality of locations of the solution set, wherein evaluating the plurality of locations comprises assigning a score to each location of the solution set, the score based in part on a signal quality or a geometry of a satellite associated with each location of the solution set;
correlate the locations in the solution set to remove a location from the solution set based on the assigned scores;
track an orientation of the receiver module with respect to a satellite associated with the location removed from the solution set; and
determine a receiver module position based on one or more locations remaining in the solution set.

16. The computer program product of claim 15, wherein the processor is further configured to:
associate an error with a location remaining in the solution set, the location remaining in the solution set comprising two or more locations, wherein the receiver module position is determined based on a least erroneous location of the two or more locations remaining in the solution set.

* * * * *